July 19, 1932.  E. A. SPERRY  1,867,684
MEANS FOR PREVENTING THE VIBRATION OF CRANK SHAFTS
Original Filed Dec. 17, 1919
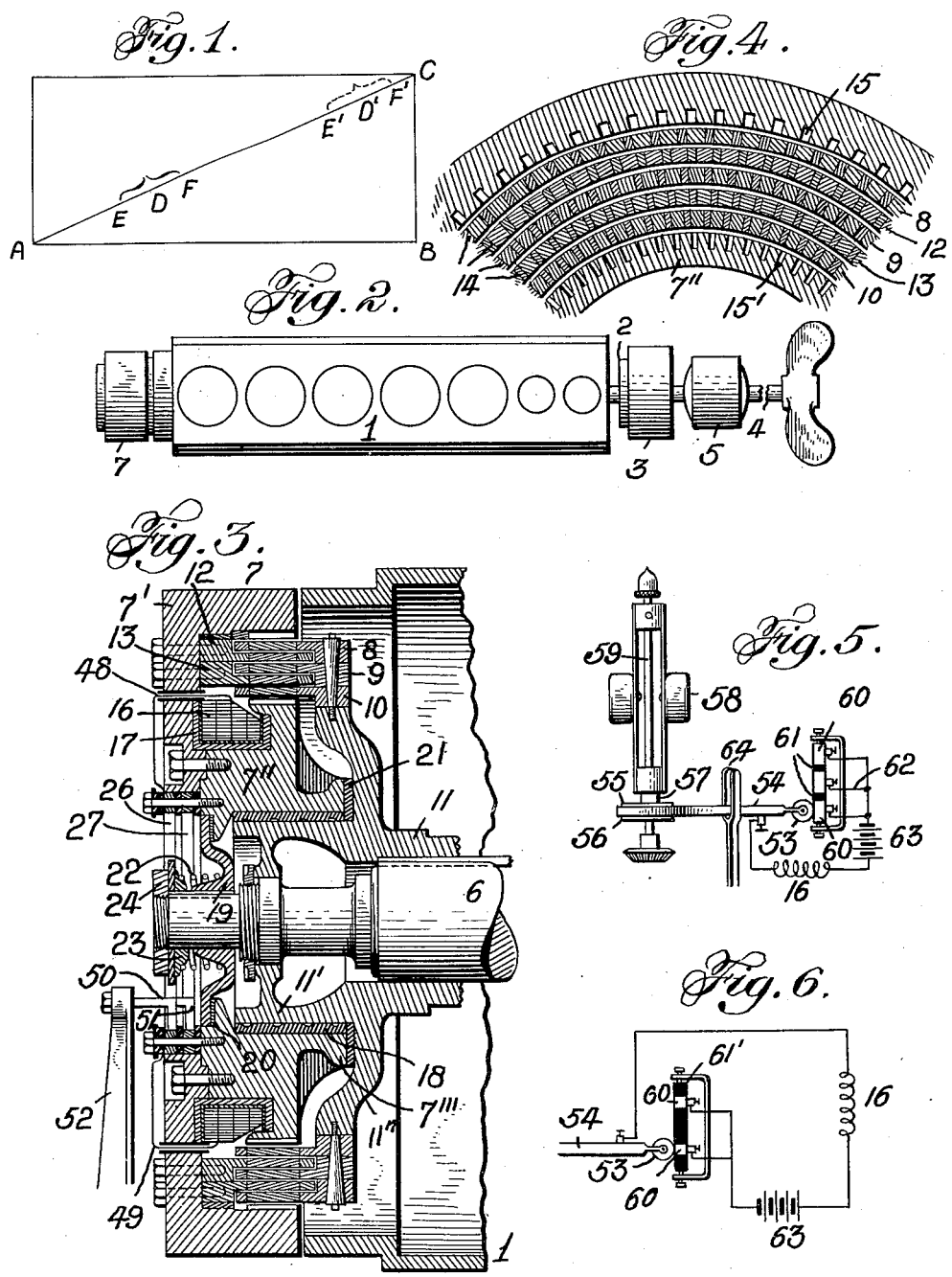

Patented July 19, 1932

1,867,684

UNITED STATES PATENT OFFICE

ELMER A. SPERRY, OF BROOKLYN, NEW YORK, ASSIGNOR TO SPERRY DEVELOPMENT COMPANY, OF DOVER, DELAWARE, A CORPORATION OF DELAWARE

MEANS FOR PREVENTING THE VIBRATION OF CRANK SHAFTS

Original application filed December 17, 1919, Serial No. 345,660. Divided and this application filed June 4, 1928. Serial No. 282,820.

This invention relates to improvements in engines or other sources of power and the transmission of power therefrom. As is well known, the crank shaft of every internal combustion engine has a natural period of torsional vibration, which is reached when said shaft of the engine attains a certain speed of rotation, hereinafter referred to as the critical speed. Particularly in the case of internal combustion engines of ten or twelve cylinders, such as are used in propelling certain types of ships and submarines, when this natural period is attained the entire structure on which the engine is mounted may be severely racked and shaken. Accordingly I have devised means for minimizing the vibrations of the engine. A further object of the invention is the provision of an improved, non-friction coupling in connection with such means. Another object of my invention is to provide an improved connection or clutching means between a driving member and a driven member which are not in exact alignment, whereby one member may be driven from the other and at the same time slight play between the two permitted. This application is a division of my Patent No. 1,697,292, dated January 1, 1929, application filed December 17, 1919, for engines and the transmission of power therefrom.

Referring to the drawing, wherein I have shown what I now consider to be the preferred forms of my invention:

Fig. 1 is a diagram for illustrating the application of my invention.

Fig. 2 is a plan view showing the features of my invention in connection with an engine, a motor, and a propeller shaft of a submarine or other craft.

Fig. 3 is a longitudinal sectional view of means for changing the moment of inertia of the crank shaft of the engine.

Fig. 4 is an enlarged sectional view of parts shown in Fig. 3.

Fig. 5 is a diagrammatic view of one form of means for controlling the means shown in Fig. 3 in accordance with the engine speed.

Fig. 6 is a view of a modification of the means shown in Fig. 5.

In Fig. 1 let time be measured along line A B, and speeds of rotation of the crank shaft in revolutions per minute along line B C. Then line A C represents the normal variation of speed of the crank shaft in accordance with time as the engine is started until a certain speed is attained. As the critical speed, say 160 revolutions per minute, is approached, the natural period of torsional vibration of the crank shaft is reached and consequently rapid and violent torsional vibrations of said shaft occur until the limit of the range of speed corresponding to such natural period of vibration is passed. Let point D on line A C denote the aforesaid critical speed. If now, as said speed is approached the moment of inertia of the crank shaft be changed, at point E, for example, the critical speed is also changed and the speed of rotation of the crank shaft may pass through the aforesaid range of speed without the occurrence of the natural period of vibration of the crank shaft. The objectionable vibrations of the crank shaft may be thus prevented and the strain on the engine support considerably lessened. After the speed of rotation of the crank shaft has passed through the range E F the moment of inertia of the crank shaft is restored to its original value and the speed may be increased further without the natural period of vibration of the crank shaft occurring. If there should be more than one critical speed, such as D', the moment of inertia of the crank shaft should be again changed at points E' and F'.

In Fig. 2 I have shown an internal combustion engine 1 connected through my preferred form of electro-magnetic torque applying device 2, 3 with a propeller shaft 4. Said propeller shaft may be driven by a motor 5, as is common in submarines, after engine 1 has been unclutched therefrom. For changing the moment of inertia of the crank shaft 6 of the engine 1, a fly-wheel 7 is adapted to be clutched to and unclutched from said shaft.

While various means may be provided for clutching shaft 6 and flywheel 7 together I prefer to provide an electro-magnetic torque applying device, which, for the purposes of this disclosure may be briefly termed a "clutch", comprising a series of annular members of non-magnetic material having inserts of steel or other magnetic material. In Figs. 3 and 4 it will be seen that three of these rings 8, 9, and 10 are shown secured to member 11 keyed or otherwise secured to shaft 6 to rotate therewith. Two similar rings 12 and 13 are secured to section 7′ of flywheel 7, so that ring 8 surrounds ring 12, ring 12 surrounds ring 9, ring 9 surrounds ring 13, and ring 13 surrounds ring 10. Each of these annular members is provided with steel or iron inserts 14 which may extend in a direction parallel to the axis of the shaft 6 and flywheel 7 and are preferably equidistantly spaced in a circumferential direction. To increase the torque of the device the periphery of flywheel 7 which surrounds ring 8 may be grooved to provide teeth 15 which correspond to the steed inserts in any one of the annular members both in spacing and in number. Likewise, the periphery of section 7″ of flywheel 7 which is surrounded by ring 10 may be similarly grooved and provided with teeth 15′. While various means may be provided for passing magnetic flux through the members, I prefer to provide a magnetizing coil 16 mounted on a ring 17 of non-magnetic material secured between sections 7′ and 7″ of the flywheel as shown. With the arrangement shown it will be readily seen that when coil 16 is energized, magnetic flux will pass through section 7′, teeth 15, the magnetic inserts 14, teeth 15′, and section 7″, thus tending to align the inserts in the corresponding rings. Movement of the set of rings on member 11 when coil 16 is energized, will thus cause corresponding movement of the other set together with flywheel 7. As shown, flywheel 7 may comprise two sections 7′ and 7″ secured together and rotatably mounted on an axial extension 11′ of member 11. If desired, a lining of bearing metal 18, such as babbitt or bronze, may be interposed between sections 7″ 11′ as is customary in bearings. Preferably there should be sufficient friction between flywheel 7 and member 11 to cause the flywheel to be dragged along with the shaft 6, though at a lesser speed of rotation, for a purpose to be mentioned later. As it may be desirable to vary this amount of friction means for adjusting the friction are preferably provided. One form of such means is illustrated in Fig. 3 and may be constructed substantially as follows:

Adjacent section 7″ of flywheel 7 is a member 19 slidably connected to shaft 6 for rotation therewith. Preferably a suitable metal lining 20 is interposed between adjacent flanges on members 19 and 7″ and a similar lining 21 may be placed between extension 7‴ of section 7″ and extension 11″ of member 11. A spring 22, mounted between members 19 and 23, the latter being likewise rotatable with shaft 6 and slidable thereon, serves to force the end of extension 7‴ of flywheel 7 against lining 21 and portion 11″ of member 11. To vary the action of the spring, the end of shaft 6 may be threaded and a nut 24 mounted thereon. Obviously as nut 24 is turned in one direction or the other the tension of spring 22 is varied and the friction between flywheel 7 and member 11 regulated.

To supply current to magnetizing coil 16 I have shown a pair of collector rings 26 and 27 insulated from each other and from flywheel 7, to which they are bolted as shown. Conductors 48 and 49 from coil 16 pass through poles provided in flywheel 7 for connection with rings 26 and 27, one conductor being connected with ring 26 and the other with ring 27. Brushes 50 and 51 engage rings 26 and 27 respectively for supplying current thereto, said brushes being mounted on a suitable stationary support 52.

In Fig. 5 I have shown one form of means for making and breaking a circuit through coil 16 in response to the speed of rotation of the crank shaft. A roller 53 is carried by an arm 54 engaged between two flanges 55, 56 on a depending sleeve 57 of a governor 58, the shaft 59 of which governor may be rotated in any suitable manner by the engine 1. It is evident that either of two methods may be employed for effecting the purposes of the invention. Either the flywheel 7 may be normally coupled to shaft 6 and uncoupled as the critical speed is passed through or it may be normally uncoupled and only coupled to the shaft as such critical speed is passed through. If it should be desired to unclutch the flywheel from the crank shaft as the critical speed is approached and to clutch the flywheel and shaft together after said speed has been passed, the arrangement of contacts 60 and strips of insulation 61, as shown in Fig. 5, may be provided. Said contacts 60 are adapted to be engaged by roller 53 and are connected by conductors 62 with one pole of a source of E. M. F. 63. To the other pole of said source are connected coil 16 and roller 53. It will thus be seen that, when roller 53 is in engagement with one of contacts 60, coil 16 will be energized and magnetic flux will be passed through the members of the torque applying device to couple flywheel 7 to shaft 6, so that both flywheel and shaft rotate with the same speed. When, however, the critical speed is approached, roller 53 engages one of the strips of insulation 61, whereupon the circuit through coil 16 is broken and flywheel 7 is unclutched from shaft 6. The moment of inertia of the crank shaft 6 is thus changed and the critical speed also changed. The natural period of vibration of the crank shaft thus does not occur at the speed at which it would have occurred had the said moment of inertia not been changed, and the speed of rotation of the crank shaft passes through the range E F of Fig. 1 without the occurrence of said period of vibration. As a speed corresponding to point F is reached, roller 53 comes into contact with the next contact segment 60, whereupon the flywheel 7 is again clutched to shaft 6 and the original critical speed restored. However, the speed of shaft 6 has been increased sufficiently to have passed said critical speed. As many strips of insulation 61 should be provided as there are critical speeds. Thus in Fig. 5 two such strips are shown corresponding with critical speeds D and D' of Fig. 1. A relatively stationary guideway 64 is shown for preventing lateral displacement of arm 54 and roller 53.

If it is desired to increase the moment of inertia of the shaft 6 as the critical speed is approached, the arrangement of contacts 60' and insulation 61' shown in Fig. 6 may be substituted for the arrangement of contacts 60 and 61 of Fig. 5. When the speed of rotation of shaft 6 corresponds to point E in Fig. 1, roller 53 passes from a strip of insulation 61' on to a contact segment 60', thereby closing a circuit through coil 16 and clutching flywheel 7 to shaft 6. Preferably there should be sufficient friction between the flywheel and shaft so that when the flywheel is unclutched from the shaft it will rotate with it at almost the same speed, thereby enabling the torque applying device to take hold and prevent any appreciable decrease of speed of shaft 6 when said flywheel is clutched thereto. Means for providing suitable friction between the flywheel and shaft have already been described. By clutching said flywheel and shaft together, the moment of inertia and consequently the critical speed of the shaft are changed so that the speed of said shaft can pass safely through the original critical speed without the natural period of vibration of the engine occurring. Upon reaching a speed corresponding to point F, roller 53 passes into engagement with the next strip of insulation 61', thus breaking the circuit through coil 16 and uncoupling the flywheel 7 from crank shaft 6.

It will thus be seen that I have provided means for preventing objectionable vibrations of the engine from occurring by changing the moment of inertia of the crank shaft as the critical speed is approached, thereby changing the critical speed, and then, after the speed of the crank shaft exceeds the original critical speed by a sufficient amount, restoring the moment of inertia of the crank shaft to its original value. Consequently at no time during the rotation of the crank shaft does said crank shaft vibrate in accordance with its natural period of vibration. The objectionable vibrations of the engine are thus prevented, and the total number of its vibrations minimized.

Of course, if desired, the circuit through magnetizing coil 15 could be made and broken manually in accordance with the speed of the crank shaft as read from a suitable indicator.

In accordance with the patent statutes, I have herein described the principle of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of minimizing the vibrations of a source of power having a rotatable element which consists of changing the moment of inertia of said element when its speed of rotation approaches a value corresponding to the natural period of vibration of said source of power.

2. The method of minimizing the vibrations of a source of power having a rotatable element which consists of changing the moment of inertia of said element when a certain speed of rotation thereof is approached.

3. The combination with a source of power having a rotatable shaft, of means brought into action when the speed of rotation of said shaft approaches a value corresponding to the natural period of vibration of said source of power for changing the moment of inertia of said shaft.

4. In combination with a crankshaft subject to vibration at its critical speed, of an auxiliary flywheel mounted on said shaft but normally uncoupled therefrom, and means for coupling said flywheel and shaft when the shaft approaches its critical speed.

5. In combination with a crankshaft subject to vibration at its critical speed, of an auxiliary flywheel mounted on said shaft but normally uncoupled therefrom, and means for coupling said flywheel and shaft when the shaft approaches its critical speed and for uncoupling said flywheel as the speed of said shaft rises above the critical speed.

6. In combination with a crankshaft subject to vibration at its critical speed, of an auxiliary flywheel frictionally mounted on said shaft but normally uncoupled therefrom, means for varying the friction of said mounting, and means for coupling said flywheel and shaft when the shaft approaches its critical speed.

7. In combination with a crankshaft subject to vibration at its critical speed, of an auxiliary flywheel frictionally mounted on said shaft but normally uncoupled therefrom, spaced inserts of magnetic material on said flywheel and shaft, a coil for passing a magnetic flux through said inserts, and speed-responsive means for exciting said coil.

In testimony whereof I have affixed my signature.

ELMER A. SPERRY.